United States Patent Office 3,082,204
Patented Mar. 19, 1963

3,082,204
ALPHA-ALKOXY, ALPHA,ALPHA-DIALKYL-
METHYL PENICILLINS
Yvon Gaston Perron, 106 Stonecrest Drive, Dewitt 14, N.Y., and Lee C. Cheney, Woodchuck Hill Road, R.D., Fayetteville, N.Y.
No Drawing. Filed Nov. 4, 1959, Ser. No. 850,767
11 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to 6-($a$-alkoxy-$a,a$-dialkylacetamido)-penicillanic acids and nontoxic salts thereof.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphlococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzyl-penicillinase and thus potentiate the action of benzylpenicillin when admixed therewith and are safe for use in patients who cannot be given benzylpenicillin because they exhibit allergic reactions thereto.

There is provided, according to the present invention, a member selected from the group consisting of an acid having the formula

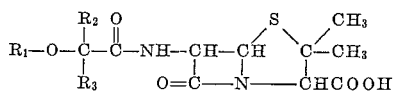

wherein $R_1$ represents a member selected from the group consisting of cyclopentyl, cyclohexyl, trifluoroethyl, tetrafluoropropyl, and aliphatic groups having from one to twenty carbon atoms inclusive and wherein $R_2$ and $R_3$ each represent a member selected from the group consisting of (lower)alkyl groups (including both straight and branched chain saturated aliphatic hydrocarbon groups having from 1 to 6 carbon atoms inclusive); and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin. The term "aliphatic" as used herein refers to straight and branched chain saturated and unsaturated aliphatic hydrocarbon groups having from 1 to 20 carbon atoms inclusive, e.g., methyl, ethyl, propyl, allyl, butyl, isobutyl, $a$- and $\beta$-butenyl, amyl, hexyl, lauryl, octadecyl, tetradecyl, tetradecenyl, hexadecyl, hexadecenyl, octadecyl, octadecenyl, eicosenyl, etc. The (lower)aliphatic groups, i.e., those having from 1 to 6 carbon atoms, inclusive, are preferred. The preferred penicillins of the present invention are those in which $R_1$, $R_2$, and $R_3$ are each a (lower)aliphatic hydrocarbon group and particularly those in which $R_2$ and $R_3$ are each methyl. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula

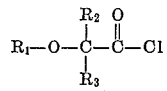

wherein $R_1$, $R_2$, and $R_3$ each have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

When an acid chloride, an acid bromide or an acid anhydride as set forth above is used in a process of the present invention, it is prepared from the corresponding $a$-alkoxy-$\alpha,\alpha$-disubstituted acetic acid (wherein the $\alpha,\alpha$-disubstituents are as represented in the formula above by $R_4$ and $R_5$) according to the techniques set forth in the literature for acids such as $\alpha$-ethoxyisobutyric acid. In any instances where such substituted acetic acid has not been described, they can be prepared by the methods described in the article by C. Weizmann et al. in the J. Amer. Chem. Soc., 70, 1153, 1953, and in "Chemistry of Carbon Compounds," E. H. Rodd, editor (1952), Elsevier Publishing Company, New York, New York, particularly at pages 788 and 789.

Thus, an elegant procedure for preparing a compound of the present invention by way of a mixed anhydride with ethoxy or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert, and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is of course advisable when more than one phase is present, e.g., solid and liquid or two liquid phases.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms precipitates, usually in crystalline form, and is collected by filtration or decantation.

6-aminopenicillanic acid is prepared according to Batchelor et al. (Nature 183, 257–258, January 24, 1959) or Belgian Patent 569,728. It is used in the above reactions as the salt of a metal or a tertiary hydrocarbonyl amine or as an ester of a hydrocarbonyl alcohol.

Hydrocarbonyl alcohols and tertiary hydrocarbonyl amines are compounds having the formulae

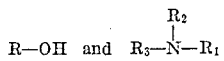

wherein the R groups contain only the elements carbon and hydrogen.

The following examples will serve to illustrate this invention without limiting it thereto.

EXAMPLE 1

*Preparation of the Potassium Salt of 6-(α-Methoxyisobutyramido)Penicillanic Acid*

α-Methoxyisobutyric acid (0.1 mole; 11.8 g.) is dissolved in a mixture of 20 ml. of acetone and 80 ml. of dioxane. While the solution is stirred and cooled, 15 ml. of triethylamine is added. The resulting cold solution (ca. −5° C.) is then slowly treated with a solution of isobutyl chloroformate (0.1 mole; 13.6 g.) in 15 ml. of dioxane, the temperature of the reaction mixture being kept below 5° C. throughout the addition. A solution of 6-aminopenicillanic acid (0.1 mole; 21.6 g.) in 100 ml. of water and 15 ml. of triethylamine is then added rapidly to the above acylating mixture with the temperature being maintained below 10° C., and the resulting clear solution is stirred in the cold for thirty minutes and thereafter at room temperature for about 2 hours. After the foregoing treatment the reaction mixture is diluted with an equal volume of water and extracted twice with ether to remove unreacted reagents and the ether extracts are discarded. The water layer is then separated, covered with 300 ml. of ether, cooled, and acidified to pH 2 with dilute sulfuric acid. The ether layer in which the product is contained is then separated, washed twice with cold water, dried over anhydrous sodium sulfate, filtered, and treated with 50 ml. of a 40% solution of potassium 2-ethylhexoate in n-butanol whereupon the product, the potassium salt of 6-(α-methoxyisobutyramido)penicillanic acid is precipitated and collected by filtration. After trituration with ether this potassium salt is dried at room temperature in vacuo over $P_2O_5$, recoved as a water-soluble while crystalline powder which is found to weigh 24.5 g., to decompose at 234–236° C., to contain the β-lactam structure as shown by infrared analysis, to inhibit *Staph. aureus* Smith at a concentration of 1.6 mcg./ml. and to exhibit versus *Stap. aureus* Smith upon intramuscular injection in mice a $CD_{50}$ of 1.8 mcg./kg.

EXAMPLE 2

*Preparation of the Potassium Salt of 6-(α-Alloxyisobutyramido)Penicillanic Acid*

α-Alloxyisobutyric acid (0.1 mole; 14.4 g.) is dissolved in a mixture of 20 ml. of acetone and 80 ml. of dioxane. While the solution is stirred and cooled, 15 ml. of triethylamine is added. The resulting cold solution (ca. −5° C.) is then slowly treated with a solution of isobutyl chloroformate (0.1 mole; 13.6 g.) in 15 ml. of dioxane, the temperature of the reaction mixture being kept below 5° C. throughout the addition. A solution of 6-aminopenicillanic acid (0.1 mole; 21.6 g.) in 100 ml. of water and 15 ml. of triethylamine is then added rapidly to the above acylating mixture with the temperature being maintained below 10° C., and the resulting clear solution is stirred in the cold for thirty minutes and thereafter at room temperature for about 2 hours. After the foregoing treatment the reaction mixture is diluted with an equal volume of water and extracted twice with ether to remove unreacted reagents and the ether extracts are discarded. The water layer is then separated, covered with 300 ml. of ether, cooled, and acidified to pH 2 with dilute sulfuric acid. The ether layer in which the product is contained is then separated, washed twice with cold water, dried over anhydrous sodium sulfate, filtered, and treated with 50 ml. of a 40% solution of potassium 2-ethylhexoate in n-butanol whereupon the product, the potassium salt of 6-(α-alloxyisobutyramido)penicillanic acid is precipitated and collected by filtration. After trituration with ether this potassium salt is dried at room temperature in vacuo over $P_2O_5$, recovered as a water-soluble white crystalline powder which is found to weigh 21.0 g., to decompose at 232–234° C., to contain the β-lactam structure as shown by infrared analysis, to inhibit *Staph. aureus* at a concentration of 1.6 mcg./ml. and to exhibit versus *Staph. aureus* Smith upon intramuscular injection in mice a $CD_{50}$ of 0.5 mcg./kg.

EXAMPLE 3

*Preparation of the Potassium Salt of 6-(α-Isopropoxyisobutyramido)Penicillanic Acid*

α-Isopropoxyisobutyric acid (0.1 mole; 14.6 g.) is dissolved in a mixture of 20 ml. of acetone and 80 ml. of dioxane. While the solution is stirred and cooled, 15 ml. of triethylamine is added. The resulting cold solution (ca. −5° C.) is then slowly treated with a solution of isobutyl chloroformate (0.1 mole; 13.6 g.) in 15 ml. of dioxane, the temperature of the reaction mixture being kept below 5° C. throughout the addition. A solution of 6-aminopenicillanic acid (0.1 mole; 21.6 g.) in 100 ml. of water and 15 ml. of triethylamine is then added rapidly to the above acylating mixture with the temperature being maintained below 10° C., and the resulting clear solution is stirred in the cold for thirty minutes and thereafter at room temperature for about 2 hours. After the foregoing treatment the reaction mixture is diluted with an equal volume of water and extracted twice with ether to remove unreacted reagents and the ether extracts are discarded. The water layer is then separated, covered with 300 ml. of ether, cooled, and acidified to pH 2 with dilute sulfuric acid. The ether layer in which the product is contained is then separated, washed twice with cold water, dried over anhydrous sodium sulfate, filtered, and treated with 50 ml. of a 40% solution of potassium 2-ethylhexoate in n-butanol whereupon the product, the potassium salt of 6-(α-isopropoxyisobutyramido)penicillanic acid is precipitated and collected by filtration. After trituration with ether this potassium salt is dried at room temperature in vacuo over $P_2O_5$, recovered as a water-soluble white crystalline powder which is found to weigh 29.3 g., to decompose at 243–244° C., to contain the β-lactam structure as shown by infrared analysis, to inhibit *Staph. aureus* Smith at a concentration of 3.125 mcg./ml. and to exhibit versus *Staph. aureus* Smith upon intramuscular injection in mice a $CD_{50}$ of 1.25 mcg./kg.

EXAMPLE 4

*Preparation of the Potassium Salt of 6-(α-Ethoxyisobutyramido) Penicillanic Acid*

α-Ethoxyisobutyric acid (0.1 mole; 13.2 g.) is dissolved in a mixture of 20 ml. of acetone and 80 ml. of dioxane. While the solution is stirred and cooled, 15 ml. of triethylamine is added. The resulting cold solution (ca. −5° C.) is then slowly treated with a solution of isobutyl chloroformate (0.1 mole; 13.6 g.) in 15 ml. of dioxane, the temperature of the reaction mixture being kept below 5° C. throughout the addition. A solution of 6-aminopenicillanic acid (0.1 mole; 21.6 g.) in 100 ml. of water and 15 ml. of triethylamine is then added rapidly to the above acylating mixture with the temperature being maintained below 10° C., and the resulting clear solution is stirred in the cold for thirty minutes and thereafter at room temperature for about 2 hours. After the foregoing treatment the reaction mixture is diluted with an equal volume of water and extracted twice with ether to remove unreacted reagents and the ether extracts are discarded. The water layer is then separated, covered with 300 ml. of ether, cooled, and acidified to pH 2 with dilute sulfuric acid. The ether layer in which the product is contained is then separated, washed twice with cold water, dried over anhydrous sodium sulfate, filtered, and treated with 50 ml. of a 40% solution of potassium 2-ethylhexoate in n-butanol whereupon the product, the potassium salt of 6-(α-ethoxyisobutyramido)penicillanic acid is precipitated and collected by filtration. After trituration with ether this potassium salt is dried at room temperature in vacuo over $P_2O_5$, recovered as a water-soluble white crystalline powder which is found to weigh 25.0 g., to decompose at 240–243° C., to contain the β-lactam structure as shown by infrared analysis, to inhibit *Staph. aureus* Smith at a concentration of 0.8 mcg./ml. and to exhibit versus *Staph. aureus* Smith upon intramuscular injection in mice a $CD_{50}$ of 5.6 mcg./kg.

EXAMPLE 5

*Preparation of the Potassium Salt of 6-(α-Isobutoxyisobutyramido)Penicillanic Acid*

α-Isobutoxyisobutyric acid (0.1 mole; 16.0 g.) is dissolved in a mixture of 20 ml. of acetone and 80 ml. of dioxane. While the solution is stirred and cooled, 15 ml. of triethylamine is added. The resulting cold solution (ca. −5° C.) is then slowly treated with a solution of isobutyl chloroformate (0.1 mole; 13.6 g.) in 15 ml. of dioxane, the temperature of the reaction mixture being kept below 5° C. throughout the addition. A solution of 6-aminopenicillanic acid (0.1 mole; 21.6 g.) in 100 ml. of water and 15 ml. of triethylamine is then added rapidly to the above acylating mixture with the temperature being maintained below 10° C., and the resulting clear solution is stirred in the cold for thirty minutes and thereafter at room temperature for about 2 hours. After the foregoing treatment the reaction mixture is diluted with an equal volume of water and extracted twice with ether to remove unreacted reagents and the ether extracts are discarded. The water layer is then separated, covered with 300 ml. of ether, cooled, and acidified to pH 2 with dilute sulfuric acid. The ether layer in which the product is contained is then separated, washed twice with cold water, dried over anhydrous sodium sulfate, filtered, and treated with 50 ml. of a 40% solution of potassium 2-ethylhexoate in n-butanol whereupon the product, the potassium salt of 6-(α-isobutoxyisobutyramido)-penicillanic acid is precipitated and collected by filtration. After trituration with ether this potassium salt is dried at room temperature in vacuo over $P_2O_5$, recovered as a water-soluble white crystalline powder which is found to weigh 29.0 g., to decompose at 237–239° C., to contain the β-lactam structure as shown by infrared analysis, and to inhibit *Staph. aureus* Smith at a concentration of 0.8 mcg./ml.

EXAMPLE 6

*Preparation of the Potassium Salt of 6-(α-Butoxyisobutyramido)Penicillanic Acid*

α-Butoxyisobutyric acid (0.1 mole; 16.0 g.) is dissolved in a mixture of 20 ml. of acetone and 80 ml. of dioxane. While the solution is stirred and cooled, 15 ml. of triethylamine is added. The resulting cold solution (ca. −5° C.) is then slowly treated with a solution of isobutyl chloroformate (0.1 mole; 13.6 g.) in 15 ml. of dioxane, the temperature of the reaction mixture being kept below 5° C. throughout the addition. A solution of 6-aminopenicillanic acid (0.1 mole; 21.6 g.) in 100 ml. of water and 15 ml. of triethylamine is then added rapidly to the above acylating mixture with the temperature being maintained below 10° C., and the resulting clear solution is stirred in the cold for thirty minutes and thereafter at room temperature for about 2 hours. After the foregoing treatment the reaction mixture is diluted with an equal volume of water and extracted twice with ether to remove unreacted reagents and the ether extracts are discarded. The water layer is then separated, covered with 300 ml. of ether, cooled, and acidified to pH 2 with dilute sulfuric acid. The ether layer in which the product is contained is then separated, washed twice with cold water, dried over anhydrous sodium sulfate, filtered, and treated with 50 ml. of a 40% solution of potassium 2-ethylhexoate in n-butanol whereupon the product, the potassium salt of 6-(α-butoxyisobutyramido)penicillanic acid is precipitated and collected by filtration. After trituration with ether this potassium salt is dried at room temperature in vacuo over $P_2O_5$, recovered as a water-soluble white crystalline powder which is found to weigh 26.0 g., to decompose at 233–235° C., to contain the β-lactam structure as shown by infrared analysis and to inhibit Staph. aureus Smith at a concentration of 3.125 mcg./ml.

EXAMPLE 7

*Preparation of the Potassium Salt of 6-(α-Trifluoroethoxy-isobutyramido)Penicillanic Acid*

α-Trifluoroethoxyisobutyric acid (0.1 mole; 21.0 g.) is dissolved in a mixture of 20 ml. of acetone and 80 ml. of dioxane. While the solution is stirred and cooled, 15 ml. of triethylamine is added. The resulting cold solution (ca. −5° C.) is then slowly treated with a solution of isobutyl chloroformate (0.1 mole; 13.6 g.) in 15 ml. of dioxane, the temperature of the reaction mixture being kept below 5° C. throughout the addition. A solution of 6-aminopenicillanic acid (0.1 mole; 21.6 g.) in 100 ml. of water and 15 ml. of triethylamine is then added rapidly to the above acylating mixture with the temperature being maintained below 10° C., and the resulting clear solution is stirred in the cold for one hour. After the foregoing treatment the reaction mixture is adjusted to pH 8 with a saturated $NaHCO_3$ solution and extracted twice with ether to remove unreacted reagents and the ether extracts are discarded. The water layer is then separated, covered with 300 ml. of ether, cooled, and acidified to pH 2 with dilute sulfuric acid. The ether layer in which the product is contained is then separated, washed twice with cold water, dried over anhydrous sodium sulfate, filtered, and treated with 48 ml. of a 40% solution of potassium 2-ethylhexoate in n-butanol whereupon the product, the potassium salt of 6-(α-trifluoroethoxyisobutyramido)penicillanic acid is precipitated and collected by filtration. After trituration with ether this potassium salt is dried at room temperature in vacuo over $P_2O_5$, recovered as a water-soluble white crystalline powder which is found to weigh 21.8 g., to decompose at 269–270° C., to contain the β-lactam structure as shown by infrared analysis, to inhibit Staph. aureus Smith at a concentration of 0.8 mcg./ml. and to exhibit versus Staph. aureus Smith upon intramuscular injection in mice a $CD_{50}$ of 0.65 mcg./kg.

EXAMPLE 8

*Preparation of α-Trifluoroethoxyisobutyric Acid*

Chloroform (229.85 gm.; 1.925 mole) which is distilled from potassium hydroxide prior to use is added to a heated refluxing solution containing trifluoroethanol (137.5 gm.; 1.375 mole) sodium hydroxide (312 gm.; 7.8 mole) and anhydrous acetone (1382.3 gm.; 23.8 mole) at such a rate as to maintain refluxing temperature. After the addition of the chloroform is completed, the mixture is refluxed for 4 hours and then protected from moisture by a calcium chloride drying tube and allowed to stand at room temperature for 2 days. The excess acetone is then distilled off and the reaction mixture is saturated with carbon dioxide which causes the precipitation of a large amount of white solid material. The solids are filtered out and the filtrate extracted with ether and air is bubbled through the aqueous layer to remove all traces of ether. Dilute sulfuric acid is then added to the aqueous layer whereupon a brown oil is formed in solution and separated. Vacuum distillation of the brown oil yields 105.69 gm. of a clear yellow liquid of the following characteristics: B.P. 80–87°/8 mm.; $n_D^{29}=1.3819$. Analysis: Carbon 41.8%; hydrogen 5.66%. The clear yellow liquid is diluted with 500 cc. of ether and extracted with 100 cc. of water three times. The ether extract is then dried over anhydrous sodium sulfate, filtered and stripped under reduced pressure. The residue is vacuum distilled yielding two fractions, one of which has a B.P. of 83–89° C./8 mm. which is distilled again under vacuum to yield α-trifluoroethoxyisobutyric acid having a B.P. of 89–91° C./8 mm. ($n_D^{30}=1.3730$) having the following analysis: Calculated (for α-trifluoroethoxyisobutyric acid): Carbon 38.71%; hydrogen 4.84%. Found: Carbon 39.2%; hydrogen 5.18%.

EXAMPLE 9

*Preparation of the Potassium Salt of 6-[α-2,2,3,3-Tetra-fluoropropoxy)Isobutyramido]Penicillanic Acid*

α - (2,2,3,3 - tetrafluoropropoxy)-isobutyric acid (0.01 mole; 2.17 g.) is dissolved in a mixture of 6 ml. of dry acetone and 23 ml. of dry dioxane. While the solution is stirred and cooled, 1.4 ml. of dry triethylamine is added. The resulting cold solution (ca. −2° C.) is then slowly treated (dropwise) with a solution of isobutyl chloroformate (0.01 mole; 0.95 g.) and thereafter stirred at about 0° C. for one-half hour. A solution of 6-aminopenicillanic acid (0.01 mole; 2.16 g.) in 3.0 ml. of water and 1.4 ml. of triethylamine at 0° C. is then added to the above acylating mixture with the temperature being maintained below 10° C., and the resulting solution is stirred in the cold for one hour at 0° C. After the foregoing treatment the reaction mixture is diluted with 40 ml. of cold water containing 0.8 gm. of $NaHCO_3$ and extracted twice with 30 ml. portions of cold ether to remove unreacted reagents; the ether extracts are then discarded. The water layer is then separated, acidified to pH 2 with 6 N sulfuric acid, and extracted twice with 40 ml. portions of cold ether. The ether layer, in which the product is contained, is then separated, washed with 15 ml. of cold water, dried over anhydrous sodium sulfate, filtered, and treated with 5.0 ml. of a 40% solution of potassium 2-ethylhexoate in n-butanol whereupon the product, the potassium salt of 6[α-(2,2,3,3-tetrafluoropropoxy)-isobutyramido]penicillanic acid is precipitated and collected by filtration. After trituration with ether, this potassium salt is dried at room temperature in vacuo over $P_2O_5$, recovered as a water-soluble white crystalline powder which is found to weigh 3.09 g. (72.4% of theoretical yield), to decompose at 263–265° C., to contain the β-lactam structure as shown by infrared analysis, to inhibit Staph. aureus Smith at a concentration of 0.001 percent by weight.

EXAMPLE 10

In the procedure of Example 1, the α-methoxyisobutyric acid is replaced by 0.1 mole of α-cyclohexyloxy-α-methylpropionic acid, α-cyclopentyloxyisobutyric acid, α-methoxy-α,α-diisopropyl-acetic acid, α-allyloxy-α-propylbutyric acid, α-ethoxy-α,α-diethylacetic acid, α-propoxy-α-isobutylbutyric acid, α-isobutoxy-α-methylhexanoic acid, α-octadecyloxy-α-ethylhexanoic acid, α-butoxy-α-ethylpropionic acid, α-(β-butenyloxy)-α-methylpropionic acid, α-hexadecyloxyisobutyric acid, and α-hexadecenyloxy-α-propylbutyric acid, respectively, to produce the acids, 6-(α - cyclohexyloxy - α - methylpropionamido)penicillanic acid, 6-(α-cyclopentyloxy-α-methylpropionamido)penicillanic acid, 6-(α-methoxy-α,α-diisopropylacetamido)penicillanic acid, 6-(α-allyloxypropylbutyramido)penicillanic acid, 6-(ethoxy-α,α-diethylacetamido)penicillanic acid, 6-(α-propoxy-α-isobutylbutyramido)penicillanic acid, 6-(α-isobutoxy-α-methylhexanamido)penicillanic acid, 6-(α-octadecyloxy-α-ethylhexanamido)penicillanic acid, 6-(α-butoxy-α-ethylpropionamido)penicillanic acid, 6-[α-(β-butenyloxy)-α-methylpropionamido]penicillanic acid, 6-(α-hexadecyloxyisobutyramido)penicillanic acid, and 6-(α-hexadecenyloxy-α-propylbutyramido)penicillanic acid, respectively, which are isolated as their solid, water-soluble potassium salts and found to inhibit *Staph. aureus* Smith at concentrations of 0.001 percent by weight.

We claim:
1. A member selected from the group consisting of the acids having the formula

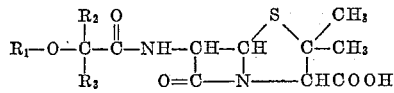

wherein $R_1$ represents a member selected from the group consisting of cyclopentyl, cyclohexyl, tetrafluoropropyl, trifluoroethyl, and aliphatic hydrocarbon groups having from 1 to 20 carbon atoms inclusive and wherein $R_2$ and $R_3$ each represent a member selected from the group consisting of (lower)alkyl groups and their sodium, potassium, calcium, aluminum and ammonium salts and their nontoxic substituted ammonium salts with an amine selected from the group consisting of tri(lower)alkylamines, procaine, dibenzylamine, N-benzyl-beta-phenethylamine, 1-ephenamine, N,N'-bis-dehydroabietylethylenediamine, N,N'-dibenzylethylenediamine, and dehydroabietylamine.

2. 6-(α-methoxyisobutyramido)penicillanic acid.
3. 6-(α-butoxyisobutyramido)penicillanic acid.
4. 6-(α-isopropoxyisobutyramido)penicillanic acid.
5. 6-(α-allyloxyisobutyramido)penicillanic acid.
6. 6-(α-isobutoxyisobutyramido)penicillanic acid.
7. 6-(α-ethoxyisobutyramido)penicillanic acid.
8. 6-(α-trifluoroethoxyisobutyramido)penicillanic acid.
9. 6-(α-cyclohexyloxyisobutyramido)penicillanic acid.
10. 6-(α-tetrafluoropropoxyisobutyramido)penicillanic acid.
11. 6-(α-allyloxy-α-ethylbutyramido)penicillanic acid.

References Cited in the file of this patent
UNITED STATES PATENTS

| | | |
|---|---|---|
| 2,479,295 | Behrens et al. | Apr. 16, 1949 |
| 2,479,296 | Behrens et al. | Apr. 16, 1949 |
| 2,479,297 | Behrens et al. | Apr. 16, 1949 |
| 2,562,410 | Behrens et al. | July 31, 1951 |
| 2,934,540 | Sheehan | Apr. 26, 1960 |
| 2,941,995 | Doyle | June 21, 1960 |

FOREIGN PATENTS

| | | |
|---|---|---|
| 569,728 | Belgium | Nov. 15, 1958 |